US012680313B2

(12) United States Patent
Boucké

(10) Patent No.: US 12,680,313 B2
(45) Date of Patent: Jul. 14, 2026

(54) DECORATIVE PANEL, METHOD OF PRODUCING SUCH A PANEL, AND A SURFACE COVERING WHICH IS CONSTRUCTED BY A MULTITUDE OF SUCH PANELS

(71) Applicant: i4F Licensing NV, Turnhout (BE)

(72) Inventor: Eddy Alberic Boucké, Turnhout (BE)

(73) Assignee: i4F Licensing NV, Turnhout (BE)

( * ) Notice: Subject to any disclaimer, the term of this patent is extended or adjusted under 35 U.S.C. 154(b) by 70 days.

(21) Appl. No.: 18/696,655

(22) PCT Filed: Sep. 29, 2022

(86) PCT No.: PCT/EP2022/077214
§ 371 (c)(1),
(2) Date: Mar. 28, 2024

(87) PCT Pub. No.: WO2023/052559
PCT Pub. Date: Apr. 6, 2023

(65) Prior Publication Data
US 2024/0401341 A1     Dec. 5, 2024

(30) Foreign Application Priority Data
Sep. 30, 2021     (NL) ...................................... 2029282

(51) Int. Cl.
B32B 3/06 (2006.01)
B32B 5/02 (2006.01)
(Continued)

(52) U.S. Cl.
CPC ............ E04F 13/0866 (2013.01); B32B 3/06 (2013.01); B32B 5/02 (2013.01); B32B 7/02 (2013.01); B32B 9/047 (2013.01); B32B 37/12 (2013.01); B32B 38/145 (2013.01); E04F 13/0894 (2013.01); E04F 15/02038 (2013.01);
(Continued)

(58) Field of Classification Search
None
See application file for complete search history.

(56) References Cited

U.S. PATENT DOCUMENTS 10,563,411 B2     2/2020  Patki et al.
11,130,352 B2     9/2021  Pervan et al.
(Continued)

FOREIGN PATENT DOCUMENTS

AU          2018272933 A1     11/2018
EP            3456900 A1      9/2017

*Primary Examiner* — Laura C Powers
(74) *Attorney, Agent, or Firm* — The Webb Law Firm

(57) ABSTRACT
Provided is a decorative panel, in particular a wall, floor or ceiling panel, of a planar design having a top side, a bottom side and side edges. The side edges include at least one pair of opposite side edges, and preferably two pairs of opposite side edges. Each pair of opposite side edges is provided with mutually interconnecting profiles that are configured to allow for an interconnection of two adjacent panels. The panel includes a carrier layer which is made from a single layer of a ceramic, stone, and/or mineral material. The carrier layer has an upper side that is provided with a printed layer having a decorative image which includes inorganic pigments, in particular metal-based pigments. The printed layer preferably is a glaze layer.

14 Claims, 1 Drawing Sheet

(51) Int. Cl.
|  |  |
|---|---|
| *B32B 7/02* | (2019.01) |
| *B32B 9/04* | (2006.01) |
| *B32B 37/12* | (2006.01) |
| *B32B 38/00* | (2006.01) |
| *E04F 13/08* | (2006.01) |
| *E04F 15/02* | (2006.01) |
| *E04F 15/10* | (2006.01) |

(52) U.S. Cl.
CPC ........ *E04F 15/107* (2013.01); *B32B 2255/20* (2013.01); *B32B 2260/021* (2013.01); *B32B 2260/046* (2013.01); *B32B 2264/10* (2013.01); *B32B 2264/303* (2020.08); *B32B 2307/4026* (2013.01); *B32B 2307/7376* (2023.05); *B32B 2451/00* (2013.01); *B32B 2607/00* (2013.01); *E04F 2201/0138* (2013.01); *E04F 2201/0153* (2013.01); *E04F 2201/023* (2013.01); *E04F 2201/042* (2013.01); *E04F 2201/043* (2013.01)

(56)                References Cited

U.S. PATENT DOCUMENTS

| | | | |
|---|---|---|---|
| 2016/0121646 A1* | 5/2016 | Vermeulen | ........... B41M 5/0256 |
| | | | 156/232 |
| 2016/0376454 A1 | 12/2016 | Zavada et al. | |
| 2021/0213767 A1 | 7/2021 | Meeus et al. | |

\* cited by examiner

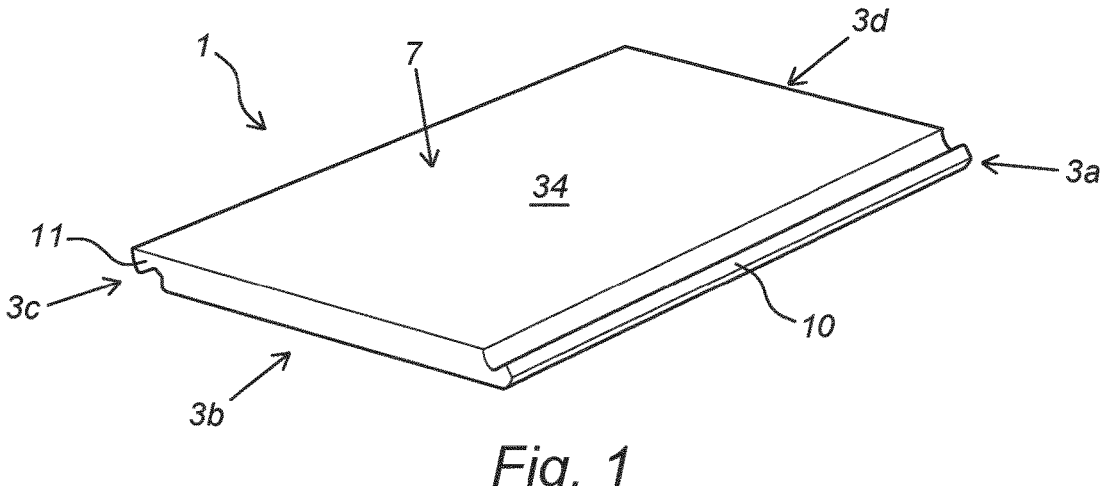
Fig. 1
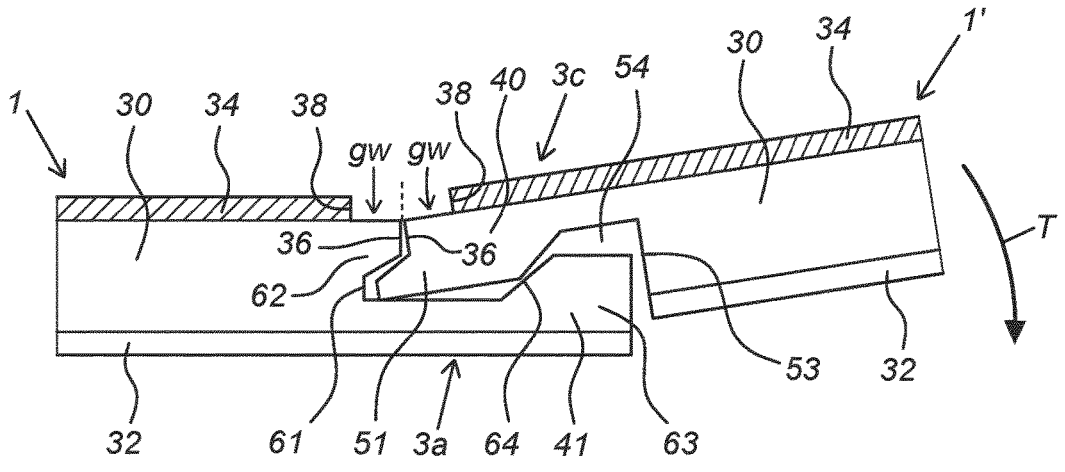
Fig. 2
Fig. 3

DECORATIVE PANEL, METHOD OF PRODUCING SUCH A PANEL, AND A SURFACE COVERING WHICH IS CONSTRUCTED BY A MULTITUDE OF SUCH PANELS

CROSS-REFERENCE TO RELATED APPLICATIONS

This application is the United States national phase of International Patent Application No. PCT/EP2022/077214 filed Sep. 29, 2022, and claims priority to The Netherlands Patent Application No. 2029282 filed Sep. 30, 2021, the disclosures of which are hereby incorporated by reference in their entireties.

BACKGROUND OF THE INVENTION

Field of the Invention

The present invention relates to a decorative panel, in particular a wall, floor or ceiling panel, of a planar design having a top side, a bottom side and side edges, wherein the side edges comprise at least one pair of opposite side edges, and preferably two pairs of opposite side edges, wherein each pair of opposite side edges is provided with mutually interconnecting profiles that are configured to allow for an interconnection of two adjacent panels.

Furthermore, the invention relates to a method of producing such a panel, and to a surface covering which is constructed by a multitude of such panels.

Description of Related Art

In the relevant art of wall, floor or ceiling panels, decorative panels have been proposed which have interconnecting profiles, which allows for constructing a so-called floating covering by a multitude of interconnected panels for a wall, floor or ceiling.

EP3456900 for example relates to a floor element comprising a fiber containing mineral board and a top decorative layer, wherein the top decorative layer comprises a printed decor and a thermally cured substance. U.S. Pat. No. 10,563,411 relates to a floor element for forming a floor covering, wherein the floor element comprises a decorative layer made of a ceramic material and a support layer arranged below this decorative layer, wherein the support layer comprises edges provided with coupling elements configured to allow a mechanical coupling with coupling elements of an adjacent floor element and wherein the floor element comprises an intermediate layer having a resin material that permeates a lower surface of the decorative layer.

Recently a general interest has raised in the field of such panels, to develop a floating covering of interconnected panels wherein the individual panels appear as authentic glazed tiles. However, it has thus far been found practically difficult and expensive to produce such panels which combine the required decorative quality to the top side of the panel, with the provision of interconnecting profiles at the side edges of the panel. The present invention is aimed at meeting the above general demand which allows for an expedient way of production of the panel and secures an optimum quality of the panel in view of its intended use. Additionally, the decorative image should have a high definition and accuracy, and the printed layer as a whole should be scratch and wear resistant.

Furthermore, it is required that the panel can be produced on a large scale using mass-production techniques.

SUMMARY OF THE INVENTION

In order to meet one or more of the above demands, the invention according to a first aspect thereof, provides a decorative panel, in particular a wall, floor or ceiling panel, of a planar design having a top side, a bottom side and side edges, wherein the side edges comprise at least one pair of opposite side edges, and preferably two pairs of opposite side edges, wherein each pair of opposite side edges is provided with mutually interconnecting profiles that are configured to allow for an interconnection of two adjacent panels, wherein the panel comprises a carrier layer which is made from a single layer of a ceramic, stone, and/or mineral material, and wherein the carrier layer has an upper side that is provided with a printed layer having a decorative image which includes inorganic pigments, in particular metal-based pigments, and which printed layer optionally is a glaze layer.

Preferably, the panel according to the invention has a laminated structure which comprises an additional sub-carrier layer having an upper surface onto which the carrier layer is directly or indirectly adhered, and wherein the sub-carrier layer is made from a different material than the carrier layer.

Such panels allow for combining structural and visual advantages of a material for tiles such as a ceramic, stone, and/or mineral material, with a supporting sub-carrier layer which is made from a different material that is less expensive, has a reduced density and has attractive insulating properties with respect to a substrate surface on which the panels are positioned.

Furthermore, because the panel has dual properties by virtue of the carrier layer and the sub-carrier layer, the panel allows for a more expedient and reliable method of production as will be set out further below.

The sub-carrier layer preferably has a thickness which is more than the thickness of the carrier layer, wherein the sub-carrier layer is in particular at least twice as thick compared to the carrier layer, more in particular at least three or four times as thick. Preferably the sub-carrier layer has a thickness more than the combined thickness of the carrier layer and printed layer, in particular at least twice as thick, more in particular at least three or four times as thick.

Such construction further make the panel less expensive and relatively little of the carrier layer material is required for the production of the panels.

Alternatively In the panel according to the invention, the carrier layer and the printed layer may form the main constructive layers of the panel, such that the bottom side of the panel is formed by a lower side of the carrier layer, and the top side of the panel is formed by an upper side of the printed layer. In such an embodiment, the carrier layer may be referred to as a monolayer, which implies that the main body of the panel is formed by the carrier layer.

The carrier layer is herein made of a material that is of a sufficiently tough quality which renders the carrier layer less brittle than materials that are usually selected for carrier layers of tiles. A suitable carrier layer in this respect, comprises a wool layer formed by vitreous fibres bonded together by a cured thermoset polymeric binder material. The wool layer may comprise stone wool, mineral wool, slag wool, basalt wool, and/or glass fibres. The binder material may be a urea-modified phenol formaldehyde resin, an alkanolamine/carboxylic acid anhydride reaction product, an acrylic resin, and/or an epoxy resin.

The quality of the material of the carrier layer thus allows for the milling of interconnecting profiles at the respective side edges of the panel, i.e. at the side edges of the carrier layer. Additionally, the chosen material results in the interconnecting profiles having a sufficient resilience which is required when adjacent profiles are interconnected to each other.

It is further preferred in the panel according to the invention, that the interconnecting profiles of the panel are an integral part of the carrier layer, and/or of the sub-carrier layer.

In particular it is preferred in the panel according to the invention, that the printed layer having a decorative image has been provided by printing of one or more ceramic inks on the upper side of the carrier layer, wherein the ceramic inks are formulated as a dispersion of inorganic pigments in a liquid medium, and wherein the printed layer has been fired after printing.

More specifically, it is preferred that the printing of the printed layer is performed by digital printing. By digital printing of the printed layer, a high level of definition and accuracy of the decorative image is obtainable, as well as a high degree of versatility in terms of altering decorative images for individual tiles during production.

Further preferred in the panel according to the invention, is that the carrier layer is provided with the printed layer has been produced as a prefabricated layer, which prefabricated layer subsequently has been adhered to the sub-carrier layer.

When the panel is produced in such a two-step process, the sub-carrier layer does not have to be exposed to the relatively high temperatures involved in the formation of a glaze layer which is required for obtaining the printed layer on the carrier layer.

In the panel according to the invention, the sub-carrier layer may be made from a polymeric material, a composite material and/or a mineral material.

Within this range, any type of material for the sub-carrier may be used, provided that the material is sufficiently resilient to the formation of interconnecting profiles by milling, and to allow for a coupling of the mutually interconnecting profiles with each other.

Advantageously, the carrier layer in the panel according to invention, is adhered onto the sub-carrier layer by an adhesive, preferably by an intermediate adhesive layer.

Particularly suitable inorganic pigments for the panel according to the invention, comprise a metal complex containing lithium, sodium, potassium, Group II element, Group IIB element, transition metal, lanthanide, aluminum, silicon, gallium, germanium, arsenic, selenium, indium, tin, antimony, lead, and/or bismuth.

Further suitable inorganic pigments for the panel according to the invention, comprise a metal complex containing carboxylate, alkoxide, β-diketonate, cyclopentadienate, pyrazolate, imidazolate, naphthanate, thiocarboxylate, dithiocarboxylate, organophosphorus, organosulfur, sulfate, sulfite, phosphate, phosphite, nitrate, nitrite, halide, perchlorate, hydroxide, ammonium, borate, silicate, and/or metal oxoanion.

It is preferred that the inorganic pigments in the panel according to invention, have an average particle size of 40 microns or smaller, preferably 10 microns or smaller, more preferably between 5 and 10 microns.

Such a size of the pigments allows for achieving a high definition and accuracy of the decorative image of the printed layer.

In an attractive embodiment of the panel according to the invention, the planar design is of a rectangular or hexagonal shape, and preferably of a square shape.

A practically useful square size for the panel lies for instance in the range between 100 mm×100 mm and 200 mm×200 mm. Other square sizes may be contemplated as well, such as 300 mm×300 mm up to 500 mm×500 mm.

The following dimensions relating to the thickness of the panel are particularly preferred according to the invention:
the panel has an overall thickness of 2 to 20 mm, preferably 4 to 14 mm, more preferably 4 to 8 mm;
the carrier layer has a thickness of 1 mm to 10 mm, preferably 2 to 6 mm, and/or the printed layer has a thickness of 1 mm to 10 mm, preferably 2 to 6 mm.

Advantageously, the panel according to the invention further includes a backing layer that is directly or indirectly adhered to a bottom side of the panel.

Such a backing layer is designed for achieving an optimum physical contact between the panel and the substrate layer on which the panel is to be placed.

According to a preferred embodiment of the panel according to the invention, the carrier layer has a multitude of peripherical sides that run parallel to a corresponding multitude of side edges of the sub-carrier layer, wherein a constant gap width exists between each peripherical side of the carrier layer and each corresponding side edge of the sub-carrier layer.

When two adjacent panels according to this embodiment are coupled with each other by the mutually interconnecting panels, the sub-carrier layers are in abutting contact with each other, while the gap width is effective in creating a distance between the respective adjacent carrier layers, such that an intermediate gap line is created between the opposed peripherical sides of adjacent carrier layers. Such an intermediate gap line is attractive from a decorative viewpoint, because the gap line can be configured is such a way that it appears as a grout line that is commonly present in tile coverings that are constructed in a classical way.

In the panel according to the invention, it is attractive that the interconnecting profiles are complementary to each other, such as a tongue and a groove profile.

It is particularly attractive in the panel according to the invention, that the interconnecting profiles allow for a coupling of two panels by a vertical and/or an angling movement of the respective side edges.

In a second aspect, the present invention relates to a method of producing a panel as defined according to the first aspect of the invention, comprising the steps of:
i) producing at least one carrier layer made from a ceramic, stone, and/or mineral material;
ii) providing an upper side of the carrier layer with a printed layer having a decorative image which includes inorganic pigments, in particular metal-based pigments, which printed layer is a glaze layer.

The above method allows the production of a panel according to the first aspect, and thus achieves the same advantages as set out above.

When performing this method, it is particularly preferred that in step ii) the printed layer is provided by printing of one or more ceramic inks on the upper side of the carrier layer, wherein the ceramic inks are formulated as a dispersion of inorganic pigments in a liquid medium, and wherein the printed layer is fired after printing in order to obtain a glaze layer.

Furthermore, it is preferred that the printing of the printed layer is performed by digital printing.

Especially preferred in the method according to the invention, is that the dispersion of inorganic pigments in a liquid medium further comprises a flux material or a frit, which preferably comprises at least one element selected from frits, sands, feldspars, aluminas, clays, zirconium silicate, zinc oxide, dolomite, calcite, kaolin, quartz, silica, barium carbonate, wollastonite, tin oxide, nepheline, bismuth oxide, colemanite, calcium carbonate, cerium oxide, cobalt oxide, copper oxide, iron oxide, aluminium phosphate, iron carbonate, manganese oxide, sodium fluoride, chromium oxide, strontium carbonate, lithium carbonate, spodumene, talc, magnesium oxide, cristobalite, rutile, anatase, or a mixture thereof.

Further preferred in the method according to the invention, is that the dispersion of inorganic pigments in a liquid medium further comprises an anti-settling material which preferably is selected from carbon black, clay, kaolin, aluminium silicate, carboxymethyl cellulose, bentonite, colloidal magnesium oxide and hydroxide, calcium, strontium, barium, tungsten, zinc, aluminum, silicon, tin and antimony.

In the method according to the invention, it is preferred that the liquid medium comprises:

a lipophilic liquid, such as an oil, and/or a hydrophilic liquid, such as water; and/or one or more non-aqueous polar solvents, preferably selected from alcohols, aliphatic fatty alcohols, glycols, polyglycols, glycols esters, glycol ethers, phenols, alkylphenols, fatty acids, terpenes, terpenic alcohols, terpenic oils, and copolymers of vinyl pyrrolidone; and/or additives, preferably selected from dispersants, rheological modifiers, surfactants, anti-foaming, buffer for pH control, bactericides, fungicides, preservatives.

Furthermore, in the method according to the invention the following embodiments are preferred with regard to the ceramic ink:

the ceramic ink contains 10 to 70 wt. % inorganic pigments, preferably 25 to 50 wt. % inorganic pigments; and/or the ceramic ink contains 5 to 40 wt. % lipophilic liquid medium, and/or 20 to 40 wt. % hydrophilic liquid medium; and/or the ceramic ink has a viscosity between 1-100 centipoise at room temperature preferably 5-70 centipoise at room temperature, and/or an average inorganic pigment particle size of 10 microns or smaller.

A particularly preferred method according to the invention, further comprises the steps of:

iii) producing a sub-carrier layer made from a different material than the carrier layer, iv) adhering the carrier layer, either directly or indirectly, onto an upper side of the sub-carrier layer in order to obtain a laminated structure.

Such a method leads to the production of a panel according to the first aspect, wherein the panel is based on the combination of a carrier layer and a sub-carrier layer with the corresponding advantages already set out above.

In this method, it is especially preferred that the carrier layer is produced according to steps i) and ii) as a prefabricated layer, which prefabricated layer is subsequently adhered onto the sub-carrier layer in step iv).

As such, the method allows to form the carrier layer via step i) and ii) before the adhesion step iv) to the sub-carrier layer is performed. This is advantageous because it prevents the sub-carrier layer being exposed to the relatively high temperatures required for formation of the glaze layer on the carrier layer (which involves firing to obtain a glaze layer). As such, the intrinsic properties of the sub-carrier layer will not be compromised, which contributes to the overall quality of the panel that is produced.

It is advantageous in the method according to the invention, that in step iv) the carrier layer is adhered onto the sub-carrier layer by application of an adhesive, preferably by application of an intermediate adhesive layer.

The method according to the invention, preferably comprises the additional step of:

providing each pair of opposite side edges of the panel with respective interconnecting profiles that are configured to interconnect with each other and thereby allow an interconnection of two adjacent panels that are obtained by the method, wherein preferably the interconnecting profiles are formed by milling.

In the case of producing a panel which includes a subcarrier layer and the sub-carrier layer, the additional step of provision of the profiles can be performed as an additional step to step i) or ii), or it may alternatively be performed as an additional step after performing step iv) of adhering of the carrier layer onto the sub-carrier layer.

In a third aspect, the invention relates to a surface covering, in particular for a floor, ceiling or wall surface, which is constructed by a multitude of adjacent panels according to the first aspect of the invention.

The invention is further disclosed in the following clauses.

1. Decorative panel, in particular a wall, floor or ceiling panel, of a planar design having a top side, a bottom side and side edges, wherein the side edges comprise at least one pair of opposite side edges, and preferably two pairs of opposite side edges, wherein each pair of opposite side edges is provided with mutually interconnecting profiles that are configured to allow for an interconnection of two adjacent panels, wherein the panel comprises a carrier layer which is made from a single layer of a ceramic, stone, and/or mineral material, and wherein the carrier layer has an upper side that is provided with a printed layer having a decorative image which includes inorganic pigments, in particular metalbased pigments, wherein the printed layer is a glaze layer.

2. Panel according to clause 1, wherein the panel has a laminated structure which comprises an additional subcarrier layer having an upper surface onto which the carrier layer is directly or indirectly adhered, and wherein the sub-carrier layer is made from a different material than the carrier layer.

3. Panel according to clause 1 or 2, wherein the interconnecting profiles of the panel are an integral part of the carrier layer, and/or of the sub-carrier layer.

4. Panel according to one of the preceding clauses, wherein the printed layer having a decorative image has been provided by printing of one or more ceramic inks on the upper side of the carrier layer, wherein the ceramic inks are formulated as a dispersion of inorganic pigments in a liquid medium, and wherein the printed layer has been fired after printing.

5. Panel according to clause 4, wherein the printing of the printed layer is performed by digital printing.

6. Panel according to one of the clauses 2-5, wherein the carrier layer provided with the printed layer has been produced as a prefabricated layer, which prefabricated layer subsequently has been adhered to the sub-carrier layer.

7. Panel according to one of the clauses 2-6, wherein the sub-carrier layer is made from a polymeric material, a composite material and/or a mineral material.

8. Panel according to one of the clauses 2-7, wherein the carrier layer is adhered onto the sub-carrier layer by an adhesive, preferably by an intermediate adhesive layer.

9. Panel according to one of the preceding clauses, wherein the inorganic pigments comprise a metal complex containing lithium, sodium, potassium, Group II element, Group IIB element, transition metal, lanthanide, aluminum, silicon, gallium, germanium, arsenic, selenium, indium, tin, antimony, lead, and/or bismuth.

10. Panel according to one of the preceding clauses, wherein the inorganic pigments comprise a metal complex containing carboxylate, alkoxide, β-diketonate, cyclopentadienate, pyrazolate, imidazolate, naphthanate, thiocarboxylate, dithiocarboxylate, organophosphorus, organosulfur, sulfate, sulfite, phosphate, phosphite, nitrate, nitrite, halide, perchlorate, hydroxide, ammonium, borate, silicate, and/or metal oxoanion.

11. Panel according to one of the preceding clauses, wherein the inorganic pigments have an average particle size of 40 microns or smaller, preferably 10 microns or smaller.

12. Panel according to one of the preceding clauses, wherein the planar design is of a rectangular or hexagonal shape, and preferably of a square shape.

13. Panel according to one of the preceding clauses, wherein the panel has an overall thickness of 2 to 20 mm, preferably 4 to 14 mm, more preferably 4 to 8 mm.

14. Panel according to one of the preceding clauses, wherein the panel further includes a backing layer that is directly or indirectly adhered to a bottom side of the panel.

15. Panel according to one of the preceding clauses 2-14, wherein the carrier layer has a multitude of peripherical sides that run parallel to a corresponding multitude of side edges of the sub-carrier layer, wherein a constant gap width exists between each peripherical side of the carrier layer and each corresponding side edge of the sub-carrier layer.

16. Panel according to one of the preceding clauses, wherein the interconnecting profiles are complementary to each other, such as a tongue and a groove profile.

17. Panel according to one of the preceding clauses, wherein the interconnecting profiles allow for a coupling of two panels by a vertical and/or an angling movement of the respective side edges.

18. Method of producing a panel as defined in one of the clauses 1-17, comprising the steps of:
   i) producing at least one carrier layer made from a ceramic, stone, and/or mineral material;
   ii) providing an upper side of the carrier layer with a printed layer having a decorative image which includes inorganic pigments, in particular metal-based pigments, which printed layer is a glaze layer.

19. Method according to clause 18, wherein in step ii) the printed layer is is provided by printing of one or more ceramic inks on the upper side of the carrier layer, wherein the ceramic inks are formulated as a dispersion of inorganic pigments in a liquid medium, and wherein the printed layer is fired after printing in order to obtain a glaze layer.

20. Method according to clause 19, wherein the dispersion of inorganic pigments in a liquid medium further comprises a flux material or a frit which preferably comprises at least one element selected from frits, sands, feldspars, aluminas, clays, zirconium silicate, zinc oxide, dolomite, calcite, kaolin, quartz, silica, barium carbonate, wollastonite, tin oxide, nepheline, bismuth oxide, colemanite, calcium carbonate, cerium oxide, cobalt oxide, copper oxide, iron oxide, aluminium phosphate, iron carbonate, manganese oxide, sodium fluoride, chromium oxide, strontium carbonate, lithium carbonate, spodumene, talc, magnesium oxide, cristobalite, rutile, anatase, or a mixture thereof.

21. Method according to clause 19 or 20, wherein the dispersion of inorganic pigments in a liquid medium further comprises an anti-settling material which preferably is selected from carbon black, clay, kaolin, aluminium silicate, carboxymethyl cellulose, bentonite, colloidal magnesium oxide and hydroxide, calcium, strontium, barium, tungsten, zinc, aluminum, silicon, tin and antimony.

22. Method according to one of the clauses 19-21, wherein the liquid medium comprises a lipophilic liquid, such as an oil, and/or a hydrophilic liquid, such as water.

23. Method according to one of the clauses 19-22, wherein the liquid medium comprises one or more non-aqueous polar solvents,
   preferably selected from alcohols, aliphatic fatty alcohols, glycols, polyglycols, glycols esters, glycol ethers, phenols, alkylphenols, fatty acids, terpenes, terpenic alcohols, terpenic oils, and copolymers of vinyl pyrrolidone.

24. Method according to one of the clauses 19-23, wherein the liquid medium comprises additives,
   preferably selected from dispersants, rheological modifiers, surfactants, anti-foaming, buffer for pH control, bactericides, fungicides, preservatives.

25. Method according to one of the clauses 19-24, wherein the ceramic ink contains 10 to 70 wt. % inorganic pigments, preferably 25 to 50 wt. % inorganic pigments.

26. Method according to one of the clauses 19-25, wherein the ceramic ink contains 5 to 40 wt. % lipophilic liquid medium, and/or 20 to 40 wt. % hydrophilic liquid medium.

27. Method according to one of the clauses 19-26, wherein the ceramic ink has a viscosity between 1-100 centipoise at room temperature preferably 5-70 centipoise at room temperature, and/or an average inorganic pigment particle size of 10 microns or smaller.

28 Method according to one of the clauses 19-27, further comprising the steps of:
   iii) producing a sub-carrier layer made from a different material than the carrier layer,
   iv) adhering the carrier layer, either directly or indirectly, onto an upper side of the sub-carrier layer in order to obtain a laminated structure.

29. Method according to one of the clause 28, wherein the carrier layer is produced according to steps i) and ii) as a prefabricated layer, which prefabricated layer is subsequently adhered onto the sub-carrier layer in step iv).

30. Method according to one of the clauses 28 or 29, wherein in step iv) the carrier layer is adhered onto the sub-carrier layer by application of an adhesive, preferably by application of an intermediate adhesive layer.

31. Method according to one of the clauses 18-25, wherein the method comprises the additional step of:

providing each pair of opposite side edges of the panel with respective interconnecting profiles that are configured to interconnect with each other and thereby allow an interconnection of two adjacent panels that are obtained by the method, wherein preferably the interconnecting profiles are formed by milling.

32. Surface covering, in particular for a floor, ceiling or wall surface, which is constructed by a multitude of adjacent panels according to one of the preceding clauses 1-17.

BRIEF DESCRIPTION OF THE DRAWINGS

The terms Fig., Figs., Figure, and Figures are used interchangeably in the specification to refer to the corresponding figures in the drawings.

The invention will be further elucidated with reference to preferred embodiments of the invention that are shown in the appended figures, wherein:

FIG. 1 shows in perspective a panel according to a first preferred embodiment of the invention;

FIG. 2 shows a cross-sectional view of two panels according to a first preferred embodiment of the invention;

FIG. 3 shows a cross-sectional view of two panels according to a second preferred embodiment of the invention.

DESCRIPTION OF THE INVENTION

FIG. 1 shows a panel 1 suitable as a floor, ceiling or wall panel, which panel is of a planar design having an top side 7, a bottom side and side edges 3*a-d* which comprise a first side edge 3*a* provided with a first interacting profile 10 and a second side edge 3*c* provided with a second interacting profile 11. On the top side 7 of the panel, a printed layer 34 is present in the form of a glaze layer having a decorative image which includes inorganic pigments.

FIG. 2 shows a cross-section of the panel 1 of FIG. 1, perpendicular to the first and second side edges 3*a* and 3*c*, which are provided with a first profile 10 and a second profile 11. The bottom side 9 of the panel 1, is provided with a backing layer 32, and is placed on a floor surface S.

The panel 1 has a laminated structure of layers that are adhered to each other, which layers extend parallel to the plane of the panel 1, and comprise:

a sub-carrier layer 28 of a polymeric material or a composite material, a carrier layer 30 of a ceramic, stone, and/or mineral material, and which is adhered onto an upper side of the sub-carrier layer, and a printed glaze layer 34 which is provided onto the upper side of the carrier layer 30.

The carrier layer 30 has two peripherical sides 38 that run parallel to the two side edges 36 of the sub-carrier layer 28, wherein a constant gap width gw exists between the peripherical side 38 of the carrier layer and the corresponding side edge 36 of the sub-carrier layer. The bottom side of the panels 1 and 1' is provided with a backing layer 32. FIG. 2 further shows that the sub-carrier layer 28 is relatively thick compared to the carrier layer 30 and the printed glaze layer 34.

Further in FIG. 2, another identical panel 1' is shown in part, of which the second side edge 3*c* is to be coupled to the panel 1, by a downward vertical movement indicated by vector D.

The coupling of the panels is based on the first profile 10 and the second profile 11 of the panels 1 and 1' being mutually interacting profiles that can be coupled to each other and are complementary to each other. During coupling, the second profile 11 of panel 1' is vertically inserted in the first profile 10 of panel 1, which involves the downward tongue 22 of panel 1' being inserted in the first groove 23 of panel 1, and the upward tongue 21 of panel 1 being inserted in the second groove 24 of panel 1'. When coupled, the panels 1 and 1' lie in a common plane which is parallel to the floor surface S.

FIG. 3 shows in a cross-section as in FIG. 2, an alternative embodiment of two panels 1 and 1' encompassed by the invention. Features that are equal to the features of the panel FIG. 2 are indicated by the same reference numerals.

FIG. 3 shows a panel having a carrier layer 30 which forms the main body of the panels 1 and 1', and wherein a sub-carrier layer as in FIG. 2 is dispensed with. The bottom side of the panels 1 and 1' is provided with a backing layer 32.

The carrier layer 30 is herein made from a wool layer formed by vitreous fibres bonded together by a cured thermoset polymeric binder material. In analogy to FIG. 2, the printed layer 34 is a glaze layer having peripherical sides 38 that run parallel to respective side edges 36 of the carrier layer 30, which define a constant gap width gw.

The panels 1 and 1' comprise two interacting profiles 40 and 41 for connecting two panels with each other. The first profile 40 of panel 1', comprises a sideward tongue 51 extending in a direction substantially parallel to the upper side of the panel, one downward flank 53 lying at a distance from the sideward tongue 51, and a downward groove 54 formed between the sideward tongue 51 and the downward flank 53.

The second profile 41 of panel 1, comprises a groove 61 configured for accommodating at least a part of the sideward tongue 51 of the first profile 40 of a second identical panel 1', said groove 61 being defined by an upper lip 62 and a lower lip 63, wherein said lower lip is provided with an upward locking element 64.

In the situation shown in FIG. 3, the first coupling profile and the second coupling profile 6 are configured such that the respective panels 1 and 1', can be coupled to each other by means of a turning movement as indicated by arrow T, which involves the sideward tongue of panel 1' being inserted into the third groove of the other identical panel 1, wherein the upward locking element 64 of the panel 1, is inserted into the second downward groove 54 of the panel 1'.

It is also envisaged by the invention, that interacting profiles 40 and 41 are provided on the side edges 3*b* and 3*d*, while the side edges 3*a* and 3*c* are provided with alternative coupling profiles 10 and 11 as shown in FIG. 2.

The embodiments shown in the appended figures and described above, effectively disclose a combination of individual features. In addition to this disclosure of subject-matter, it is noted that each individual feature shown in these embodiments may be taken apart and be construed as relating to a disclosure of another preferred variant of the invention.

The invention claimed is:

1. A decorative panel of a planar design having a top side, a bottom side and side edges, wherein the side edges comprise at least one pair of opposite side edges, wherein each pair of opposite side edges is provided with mutually interconnecting profiles that are configured to allow for an interconnection of two adjacent panels, wherein the decorative panel comprises a carrier layer which is made from a single layer of a mineral material, wherein the mineral material is a wool layer comprising vitreous fibres bonded together by a cured thermoset polymeric binder material, wherein the wool layer comprises at least one of stone wool, mineral wool, slag wool, basalt wool, and/or glass fibres;

and wherein the carrier layer has an upper side that is provided with a glaze layer having a decorative image;

wherein the decorative image is provided by printing of one or more ceramic inks on the upper side of the carrier layer, wherein the one or more ceramic inks include inorganic pigments, wherein the inorganic pigments comprise a metal complex containing carboxylate, alkoxide, β-diketonate, cyclopentadienate, pyrazolate, imidazolate, naphthanate, thiocarboxylate, dithiocarboxylate, organophosphorus, organosulfur, phosphate, phosphite, nitrate, nitrite, halide, perchlorate, hydroxide, ammonium, borate, and/or metal oxoanion.

2. The panel according to claim 1, wherein the inorganic pigments comprise a metal complex containing lithium, sodium, potassium, Group II element, Group IIB element, transition metal, lanthanide, silicon, gallium, germanium, arsenic, selenium, indium, tin, antimony, lead, and/or bismuth.

3. The panel according to claim 1, wherein the inorganic pigments have an average particle size of 40 microns or smaller.

4. The panel according to claim 1, wherein the panel has an overall thickness of 2 to 20 mm.

5. The panel according to claim 1, wherein the panel further includes a backing layer that is directly or indirectly adhered to a bottom side of the carrier layer.

6. The panel according to claim 1, wherein the interconnecting profiles allow for a coupling of two panels by a vertical and/or an angling movement of the respective side edges.

7. A method of producing a panel as defined in claim 1, comprising the steps of:

i) producing a carrier layer made from a mineral material;

ii) providing an upper side of the carrier layer with a printed layer having a decorative image which includes inorganic pigments, which printed layer is a glaze layer, wherein in step ii) the printed layer is-is provided by printing of one or more ceramic inks on the upper side of the carrier layer, wherein the ceramic inks are formulated as a dispersion of inorganic pigments in a liquid medium, and wherein the printed layer is fired after printing in order to obtain a glaze layer, and wherein the inorganic pigments comprise a metal complex containing carboxylate, alkoxide, β-diketonate, cyclopentadienate, pyrazolate, imidazolate, naphthanate, thiocarboxylate, dithiocarboxylate, organophosphorus, organosulfur, phosphate, phosphite, nitrate, nitrite, halide, perchlorate, hydroxide, ammonium, borate, and/or metal oxoanion.

8. The method according to claim 7, wherein the dispersion of inorganic pigments in a liquid medium further comprises a flux material or a frit which comprises at least one element selected from frits, zirconium silicate, zinc oxide, dolomite, calcite, kaolin, quartz, barium carbonate, wollastonite, nepheline, colemanite, calcium carbonate, cerium oxide, cobalt oxide, copper oxide, aluminium phosphate, iron carbonate, manganese oxide, sodium fluoride, chromium oxide, strontium carbonate, lithium carbonate, spodumene, talc, cristobalite, rutile, anatase, or a mixture thereof.

9. The method according to claim 7, wherein the dispersion of inorganic pigments in a liquid medium further comprises an anti-settling material which is selected from carbon black, clay, kaolin, aluminium silicate, carboxymethyl cellulose, bentonite, colloidal magnesium oxide and hydroxide, calcium, strontium, barium, tungsten, zinc, aluminum, silicon, tin and antimony.

10. The method according to claim 7, wherein the method comprises the additional step of:

providing each pair of opposite side edges of the panel with respective interconnecting profiles that are configured to interconnect with each other and thereby allow an interconnection of two adjacent panels that are obtained by the method, wherein the interconnecting profiles are formed by milling.

11. A surface covering, in particular for a floor, ceiling or wall surface, which is constructed by a multitude of adjacent panels according claim 1.

12. The panel according to claim 1, wherein the carrier layer forms a main body of said panel.

13. The panel according to claim 1, wherein the glaze layer has peripherical sides that run parallel to corresponding side edges of the carrier layer, wherein a constant gap width exists between each peripherical side of the glaze layer and each corresponding side edge of the carrier layer.

14. The panel according to claim 1, wherein the interconnecting profiles of the panel are an integral part of the carrier layer.

* * * * *